(12) United States Patent
Kheirkhah Sangdeh et al.

(10) Patent No.: US 12,328,154 B2
(45) Date of Patent: Jun. 10, 2025

(54) TECHNIQUES FOR CHANNEL STATE INFORMATION (CSI) PRE-PROCESSING

(71) Applicant: MediaTek Inc., Hsinchu (TW)

(72) Inventors: Pedram Kheirkhah Sangdeh, San Jose, CA (US); Gyu Bum Kyung, San Jose, CA (US); Yahia Ahmed Mahmoud Mahmoud Shabara, San Jose, CA (US); Jiann-Ching Guey, Hsinchu (TW)

(73) Assignee: MediaTek Inc. (TW)

( * ) Notice: Subject to any disclaimer, the term of this patent is extended or adjusted under 35 U.S.C. 154(b) by 75 days.

(21) Appl. No.: 18/374,139

(22) Filed: Sep. 28, 2023

(65) Prior Publication Data

US 2024/0137139 A1 Apr. 25, 2024

Related U.S. Application Data

(60) Provisional application No. 63/379,916, filed on Oct. 18, 2022.

(51) Int. Cl.
*H04B 17/391* (2015.01)
(52) U.S. Cl.
CPC .............................. *H04B 17/3913* (2015.01)
(58) Field of Classification Search
CPC .. H04B 7/0626; H04B 7/0456; H04B 7/0639; H04B 7/0478; H04B 7/063; H04B 7/0417; H04B 7/0658; H04B 7/0695; H04L 5/0057; H04L 5/0048; H04L 5/0051; H04L 1/0026; H04L 5/0023; H04L 5/0053; H04L 5/0094; H04L 5/001
See application file for complete search history.

(56) References Cited

U.S. PATENT DOCUMENTS

| | | | | |
|---|---|---|---|---|
| 6,956,799 B1 * | 10/2005 | Hogan | ................. | G11B 27/036 369/47.28 |
| 2008/0037669 A1 * | 2/2008 | Pan | ........................ | H04L 1/0014 375/267 |
| 2016/0149628 A1 * | 5/2016 | Davydov | ................ | H04L 5/001 370/329 |
| 2017/0099093 A1 * | 4/2017 | Zhang | ................... | H04B 7/0626 |
| 2017/0164226 A1 * | 6/2017 | Wei | ........................ | H04L 1/0026 |
| 2023/0412227 A1 * | 12/2023 | Abebe | .................. | H04B 7/0626 |
| 2024/0088965 A1 * | 3/2024 | Kheirkhah Sangdeh | ..................... | H04B 7/0626 |
| 2024/0178889 A1 * | 5/2024 | Yang | ...................... | H04B 7/048 |

* cited by examiner

*Primary Examiner* — Eva Y Puente
(74) *Attorney, Agent, or Firm* — Andy M. Han; Han IP PLLC

(57) ABSTRACT

Techniques pertaining to channeling state information (CSI) pre-processing are described. A user equipment (UE) that is in wireless communication with a base station node extracts eigenvectors (EVs) from CSI acquired by the UE. The UE generates pre-processed CSI for compression by a machine-learning (ML)-based encoder of the UE into CSI feedback for the base station node by at least performing one or more of a phase discontinuity compensation (PDC), a one-step polarization separation with re-ordering, or a two-step polarization separation that includes separation based on polarization type and separation by position on the EVs.

20 Claims, 11 Drawing Sheets

900

```
RECEIVE, AT A BASE STATION NODE, CSI FEEDBACK
FROM A UE, THE CSI FEEDBACK BEING GENERATED
FROM EVs THAT ARE EXTRACTED FROM RAW CSI
ACQUIRED BY THE UE, PRE-PROCESSED USING ONE OR
MORE OF A PDC, A ONE-STEP POLARIZATION
SEPARATION WITH RE-ORDERING, OR A TWO-STEP
POLARIZATION SEPARATION THAT INCLUDES
SEPARATION BASED ON POLARIZATION TYPE AND
SEPARATION BY POSITION, AND COMPRESSED BY A
MACHINE-LEARNING (ML)-BASED ENCODER OF THE UE

910
```

```
GENERATE, BY A PROCESSOR OF THE BASE STATION
NODE, RECONSTRUCTED CSI BY AT LEAST
DECOMPRESSING THE CSI FEEDBACK VIA AN ML-BASED
DECODER OF THE BASE STATION NODE

TECHNIQUES FOR CHANNEL STATE INFORMATION (CSI) PRE-PROCESSING

CROSS REFERENCE TO RELATED PATENT APPLICATION(S)

The present disclosure is part of a non-provisional application claiming the priority benefit of U.S. Patent Application No. 63/379,916, filed 18 Oct. 2022, the content of which herein being incorporated by reference in its entirety.

TECHNICAL FIELD

The present disclosure is generally related to wireless communications and, more particularly, to channel state information (CSI) compression and processing.

BACKGROUND

Unless otherwise indicated herein, approaches described in this section are not prior art to the claims listed below and are not admitted as prior art by inclusion in this section. In wireless communication, channel state information (CSI) includes the link properties of a communication link. CSI may be reported by a user equipment (UE) to a base station node, e.g., a gNodeB (gNB) of a wireless carrier network. In a two-sided artificial intelligence (AI)/machine-learning (ML) architecture for CSI compression, the first part of the architecture is implemented on the UE, and the second part of the architecture is implemented on the base station node. In the first part of the architecture, the UE pre-processes the CSI input into a form that is suitable for compression, and then compresses the pre-processed CSI into an abstract representation using an ML-based encoder. In the second part of the architecture, the base station node receives the abstract representation of the CSI as feedback from the UE. The base station node then decompresses the abstract representation using an ML-based decoder to reconstruct the CSI. In some instances, post-processing may be further applied by the base station node following decompression to reconstruct the CSI. The reconstructed CSI is used by the base station node for various applications, such as scheduling beamforming for the antennas of the base station node, etc.

Generally speaking, there are two forms of pre-processing that may be carried out by the UE, which are sample-variant pre-processing and sample-invariant pre-processing. In sample-variant pre-processing, the CSI pre-processing framework will change based on every CSI sample that is inputted into the ML-based encoder. In other words, a pre-processing function $f(\cdot)$ of the UE may change per the CSI sample information. However, this approach may have several drawbacks. For example, the change in the CSI pre-processing framework may add some additional feedback overhead to the compression of the CSI by the ML-based encoder, and the length of the data packets that are sent over-the-air to the base station may become longer. This is because additional information (e.g., class, scenario, configuration, statistics, etc.) regarding the CSI sample is included in the CSI feedback to the base station node, such that the additional information may be used by a post-processing function $f^{-1}(\cdot)$ of the base station node during the post-processing of the decompressed CSI. In some cases, these drawbacks of the sample-variant pre-processing may be undesirable.

In sample-invariant pre-processing, the pre-processing function $f(\cdot)$ of the UE and the post-processing function $f^{-1}(\cdot)$ of the base station node may remain the same for all CSI samples. As a result, the compression of the CSI by the ML-based encoder at the UE and the post-processing of the decompressed CSI at the base station node may be accomplished without incurring the additional feedback overhead associated with sample-variant processing.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the issue(s) described herein. More specifically, various schemes proposed in the present disclosure are believed to provide solutions for enhancing sample-invariant pre-processing of CSI by a UE to boost the performance of an ML-based encoder that compresses the CSI. This is because if the pre-processing of the CSI is optimized, then the ML-based encoder may easily capture the semantic features of the CSI and the compression of the CSI into the abstract representation may be improved. Thus, it is believed that implementations of various proposed schemes in accordance with the present disclosure may improve the operation of the AI/ML models (also referred to herein as ML models) for CSI compression in wireless communications.

In one aspect, a method may include extracting, by a processor of a UE that is in wireless communication with a base station node, eigenvectors (EVs) from raw CSI acquired (e.g., measured, estimated, and/or computed) by the UE. The method further includes generating, by the processor, pre-processed CSI for compression by an ML-based encoder of the UE into CSI feedback for the base station node by at least performing one or more of a phase discontinuity compensation (PDC), a one-step polarization separation with re-ordering, or a two-step polarization separation that includes separation based on polarization type and separation by position on the EVs.

In another aspect, a method may include receiving, at a base station node, CSI feedback from a UE. The CSI feedback is generated from EVs that are extracted from raw CSI acquired by the UE, pre-processed using one or more of a PDC, a one-step polarization separation with re-ordering, or a two-step polarization separation that includes separation based on polarization type and separation by position, and compressed by an ML-based encoder of the UE. The method further includes generating reconstructed CSI by at least decompressing the CSI feedback via an ML-based decoder of the base station node.

In yet another aspect, an apparatus may include a transceiver configured to communicate wirelessly and a processor coupled to the transceiver. The processor may extract EVs from a CSI sample of raw CSI acquired by the apparatus or another apparatus implemented in a UE. The processor may also generate training data for training an ML model by at least performing a one-step polarization separation with re-ordering or a two-step polarization separation that includes separation based on polarization type and separation by position on the EVs, in which the ML model may be included in an ML-based encoder for generating CSI feedbacks from multiple raw CSI or being included in an ML-based decoder for generating multiple reconstructed CSI from the CSI feedbacks.

It is noteworthy that, although description provided herein may be in the context of certain radio access technologies, networks, and network topologies for wireless communication, such as 5G/NR mobile communications, the proposed concepts, schemes and any variation(s)/derivative(s) thereof may be implemented in, for and by other types of radio access technologies, networks and network topologies such as, for example and without limitation, Evolved Packet System (EPS), Long-Term Evolution (LTE), LTE-Advanced, LTE-Advanced Pro, Internet-of-Things (IoT), Narrow Band Internet of Things (NB-IoT), Industrial Internet of Things (IIoT), vehicle-to-everything (V2X), and non-terrestrial network (NTN) communications. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

FIG. 9 is a flowchart of a second example process in accordance with an implementation of the present disclosure.

DETAILED DESCRIPTION

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that the description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to CSI pre-processing in the two-sided AI/ML architecture for CSI compression with respect to wireless communications. According to the present disclosure, a number of possible solutions may be implemented separately or jointly. That is, although these possible solutions may be described below separately, two or more of these possible solutions may be implemented in one combination or another.

Figure 1:
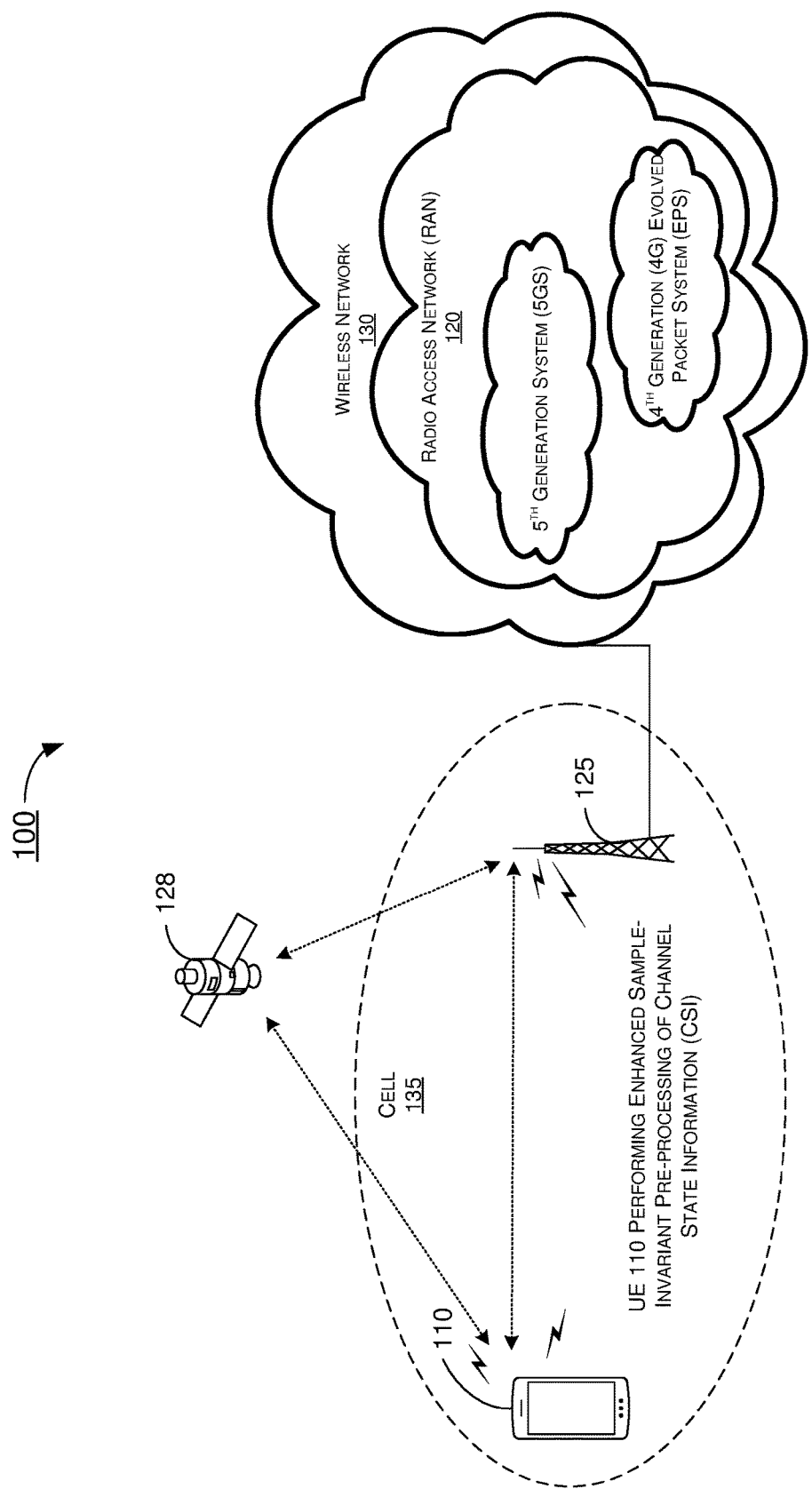
FIG. 1 is a diagram of an example network environment in which various proposed schemes in accordance with the present disclosure may be implemented.

FIG. 1 illustrates an example network environment 100 in which various solutions and schemes in accordance with the present disclosure may be implemented. FIG. 2-FIG. 10 illustrate examples of implementation of various proposed schemes in network environment 100 in accordance with the present disclosure. The following description of various proposed schemes is provided with reference to FIG. 1-FIG. 10.

Referring to FIG. 1, network environment 100 may include a UE 110 in wireless communication with a RAN 120 (e.g., a 5G NR mobile network or another type of network such as an NTN). UE 110 may be in wireless communication with RAN 120 via a base station or network node 125 (e.g., an eNB, gNB or transmit-receive point (TRP)) and/or a non-terrestrial network node 128 (e.g., a satellite). That is, UE 110 may be within coverage of a cell 135 associated with terrestrial network node 125 or non-terrestrial network node 128. RAN 120 may be a part of a network 130. In network environment 100, UE 110 and network 130 (via terrestrial network node 125 or non-terrestrial network node 128 of RAN 120) may implement various schemes pertaining to CSI pre-processing as described below. It is noteworthy that, although various proposed schemes, options and approaches may be described individually below, in actual applications these proposed schemes, options and approaches may be implemented separately or jointly. That is, in some cases, each of one or more of the proposed schemes, options, techniques, and approaches may be implemented individually or separately. In other cases, some or all of the proposed schemes, options, techniques, and approaches may be implemented jointly.

Under various proposed schemes in accordance with the present disclosure, a UE, such as the UE 110, may provide CSI feedback that is generated from a CSI input to a base station node (e.g., the terrestrial network node 125 or non-terrestrial network node 128). Further, the conversion of the CSI input to a form that is suitable for compression by an ML-based encoder on the UE 110 into the CSI feedback is performed using enhanced sample-invariant pre-processing.

The CSI acquired by the UE, which includes the channel matrix and other information that are measured, computed, and/or estimated by the UE, may be referred to as raw CSI. Since the raw CSI may include extraneous information that are not used by a base station node (e.g., information that is not necessary for beamforming), a pre-processing function of the UE may process the raw CSI into eigenvectors (EVs) through EV generation. For example, assuming a system setting with $N_{tx}$ Tx antenna, $N_{rx}$ Rx antenna, and $N_f$ frequency elements at desired frequency granularity, e.g., resource block (PRB) or subband (SB), EVs may be generated from the raw CSI as follows:

Raw CSI $H \in \mathbb{C}^{N_f \times N_{tx} \times N_{rx}}$ with $H_k = H[k, :, :]$ and
$k = 1, \ldots, N_f$ (1)

then, $[\tilde{U}_k \tilde{S}_k \tilde{V}_k] = \text{SVD}(H_k^H H_k) \Rightarrow V_{ik} = \tilde{V}_k[:, i]$ for $i = 1, \ldots N_{rx}$ (2)

then, stacking over k (frequency) and i (antenna): $V \in \mathbb{C}^{N_f \times N_{tx} \times N_{rx}}$ (3)

wherein H is the raw channel, and V is the derived singular vector that is compressed.

However, this current CSI reporting framework that is used by a UE in the context of the two-sided AI/ML architecture may face some challenges in some scenarios. For instance, one challenge may occur when the current CSI reporting framework is applied to base station nodes that use cross-polarization. Cross-polarization means antenna elements at a base station node (e.g., a gNodeB) may use different polarizations. Such polarizations may adversely affect channel vectors acquired by a UE, and in turn, the CSI acquired by the UE. For example, the estimated CSI samples of adjacent transmission (TX) elements of an antenna may have abnormally low correlations. Such low correlation in the estimated CSI samples may need to be remedied before the CSI can be fitted into an ML-based encoder for compression.

The use of cross-polarizations and the resultant poor correlation between the estimated CSI samples of adjacent TX antenna elements may also cause other problems. For example, one problem is the abrupt change of the estimated CSI in the antenna-frequency domain. Such an abrupt change may be caused by factors that include abrupt phase changes as EVs are separately calculated over frequency elements of a frequency domain, and/or abrupt changes across the antenna domain due to cross-polarization. Another problem is a dispersion of the estimated CSI in the beam-delay domain, in which the dispersion may be due to sharp changes in the antenna-frequency domain. In some instances, these problems may lead to the poor training of an ML model for CSI compression.

For example, in the case of a convolutional neural network (CNN)-based model, these problems in the CSI may lead to the waste of model learning capacity as some convolutional kernels of the CNN-based model may learn to ignore elements on antenna indices with different polarizations due to low correlation between CSI of adjacent antenna elements. In other words, convolutional kernels may zero some of their parameters to focus on relevant antenna elements, thereby wasting the learning capacity of the CNN-based model.

While the issues associated with training a CNN-based model due to these problems may be alleviated with the use of a transformer-based ML model, the use of the transformer-based ML model may lead to higher use of computing resources as the complexity of transformer-based ML models are higher. For example, a transformer-based ML has to use a large embedding size (equal to $N_{tx}$) with half of the elements within a word loosely related to the other half. Accordingly, the fitting of CSI into the transformer-based model may lead to unnecessarily big attention matrices, large forward dimension, etc. that results in higher floating-point operations (FLOPs). As a result, the net gain of using a transformer-based model over a CNN-based model may be zero or insignificant.

The enhanced sample-invariant pre-processing in accordance with the present disclosure provides several advantages over existing sample-invariant pre-processing techniques. Like existing sample-invariant pre-processing techniques, the enhanced sample-invariant pre-processing does not increase the overhead of the CSI feedback. However, unlike existing techniques, the enhanced sample-invariant pre-processing provides loss-less pre-processing that do not alter and/or reduce spatial information carried by unprocessed CSI sample. The compression-friendly pre-processed CSI that is provided by such enhanced sample-invariant pre-processing may have higher sparsity in the beam-delay domain and smoother changes in the antenna-frequency domain. Further, the enhanced sample-invariant pre-processing may provide pre-processed CSI that is configured to draw the focus of the ML models to the relevant parts of the CSI samples and enables clustered processing of the CSI to reduce the computational burden on the ML models.

Figure 2:
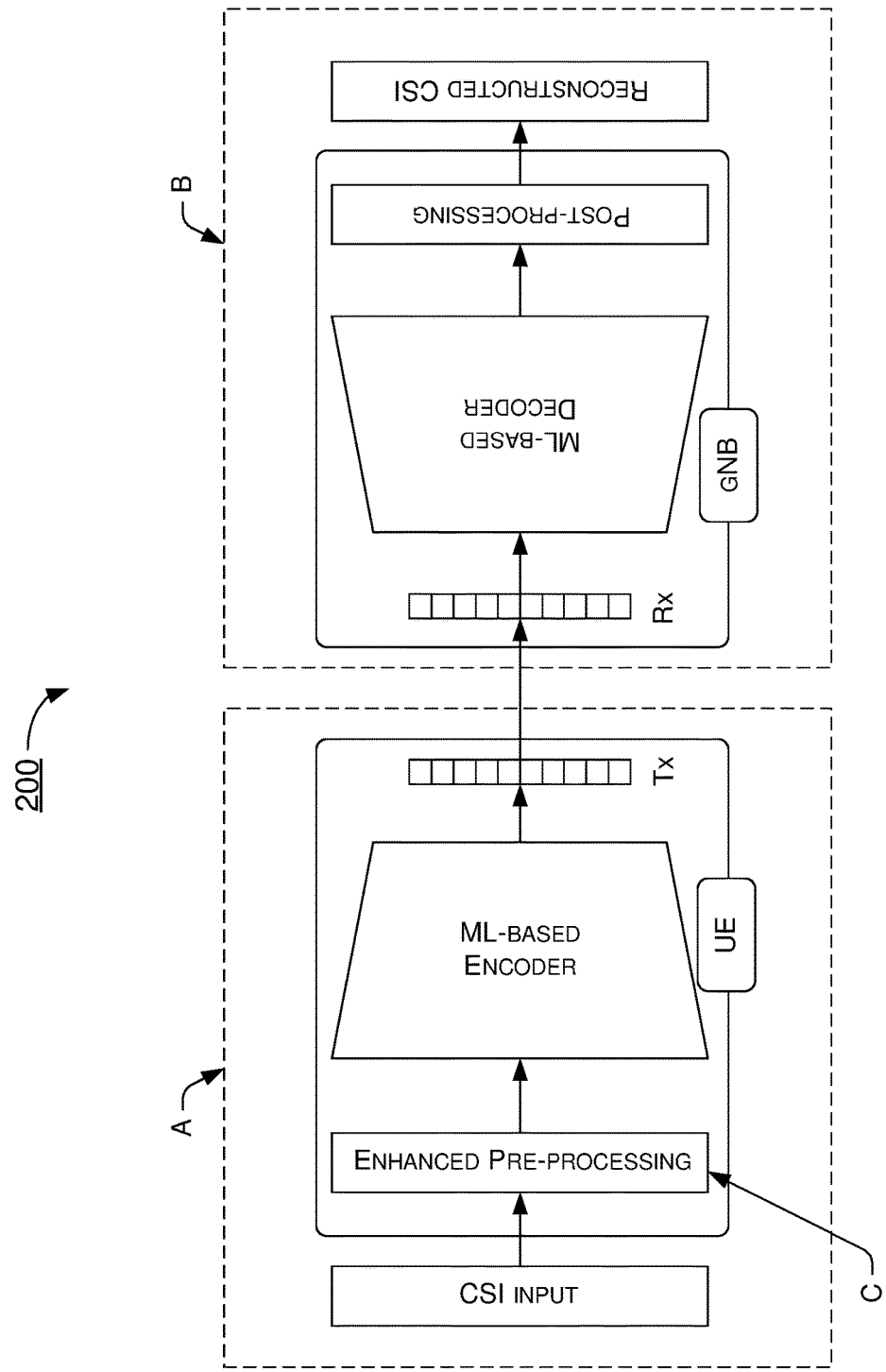
FIG. 2 illustrates an example scenario of enhanced sample-invariant pre-processing of CSI in accordance with the present disclosure.

FIG. 2 illustrates an example scenario 200 of enhanced sample-invariant pre-processing under the proposed scheme. In the example scenario, Part (A) shows the operations that are performed by a UE, and Part (B) shows the operations that are performed on a base station node. In Part (A), a CSI input acquired by the UE may be pre-processed at the UE using the enhanced sample-invariant pre-processing, labeled as (C), as opposed to conventional pro-processing, in accordance with the present disclosure. The resultant pre-processed CSI that is generated by the enhanced sample-invariant pre-processing is then compressed by an ML-based encoder into an abstract representation, i.e., CSI feedback. The CSI feedback is then transmitted by the UE to the base station node. As shown in Part (B), the CSI feedback is then received at the base station node. The abstraction representation is then decompressed by the ML-based decoder of the base station node to reconstruct the CSI. In some instances, post-processing may be further applied following decompression to reconstruct the CSI. However, in other instances, no post-processing may be applied.

Figure 3A:
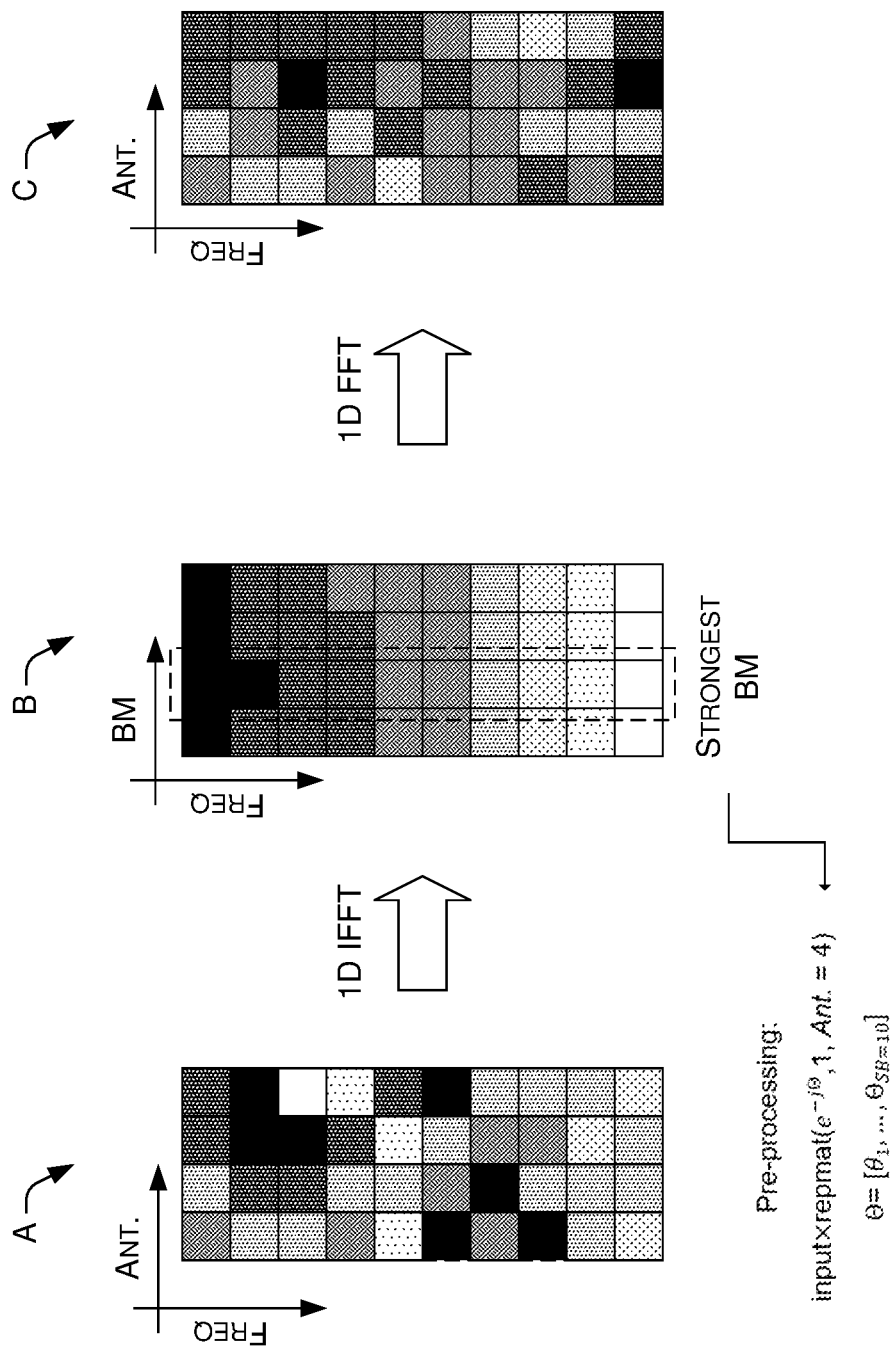
FIG. 3A illustrates a first technique of enhanced sample-invariant pre-processing of CSI in accordance with the present disclosure.

The enhanced sample-invariant pre-processing in accordance with the present disclosure may be implemented using multiple techniques that can be applied individually or in combination. A first technique is the mitigation of abrupt phase changes in the CSI with phase discontinuity compensation (PDC). This technique includes performing the following steps: (1) translate EVs from an antenna-frequency domain to a beam-frequency domain; (2) identify a strongest beam (i.e., a beam with a highest power) in the beam-frequency domain and calculate beam angles for the elements in the strongest beam; (3) compensate a beam angle of each element belonging to the one or more other beams in the beam-frequency domain by a calculated beam angle of a corresponding element of the strongest beam to generate compensated EVs; and (4) translates the compensated EVs back to the antenna-frequency domain. FIG. 3A illustrates the above technique in an example 300 that includes 10 subbands (SBs) and four (TX) elements. Part (A) of FIG. 3A shows the EVs in the antenna-frequency domain. As shown in Part (A), each EV is calculated across columns of CSI data of elements for each frequency that is represented by a corresponding row in the antenna-frequency domain. Since each EV is calculated across columns for each frequency without taking into consideration CSI data associated with other frequencies, there may be abrupt phase changes in the calculated EVs. Part (B) shows the EVs as translated into the beam-frequency domain via a one-dimensional (1D) inverse fast Fourier transfer (IFFT), in which one column of elements that belongs to the strongest beam (in power) is identified such that the beam angle of each element in the column is used to compensate the beam angles of the elements of the translated EVs in the other columns. For example, the compensation may be performed by aligning the beam angles of the other elements in each row (frequency) with a corresponding beam angle of the element of the strongest beam in that row (frequency). Part (C) shows the compensated EVs from Part (B) that are translated back to the antenna-frequency domain via a 1D fast Fourier transform (FFT).

Figure 3B:
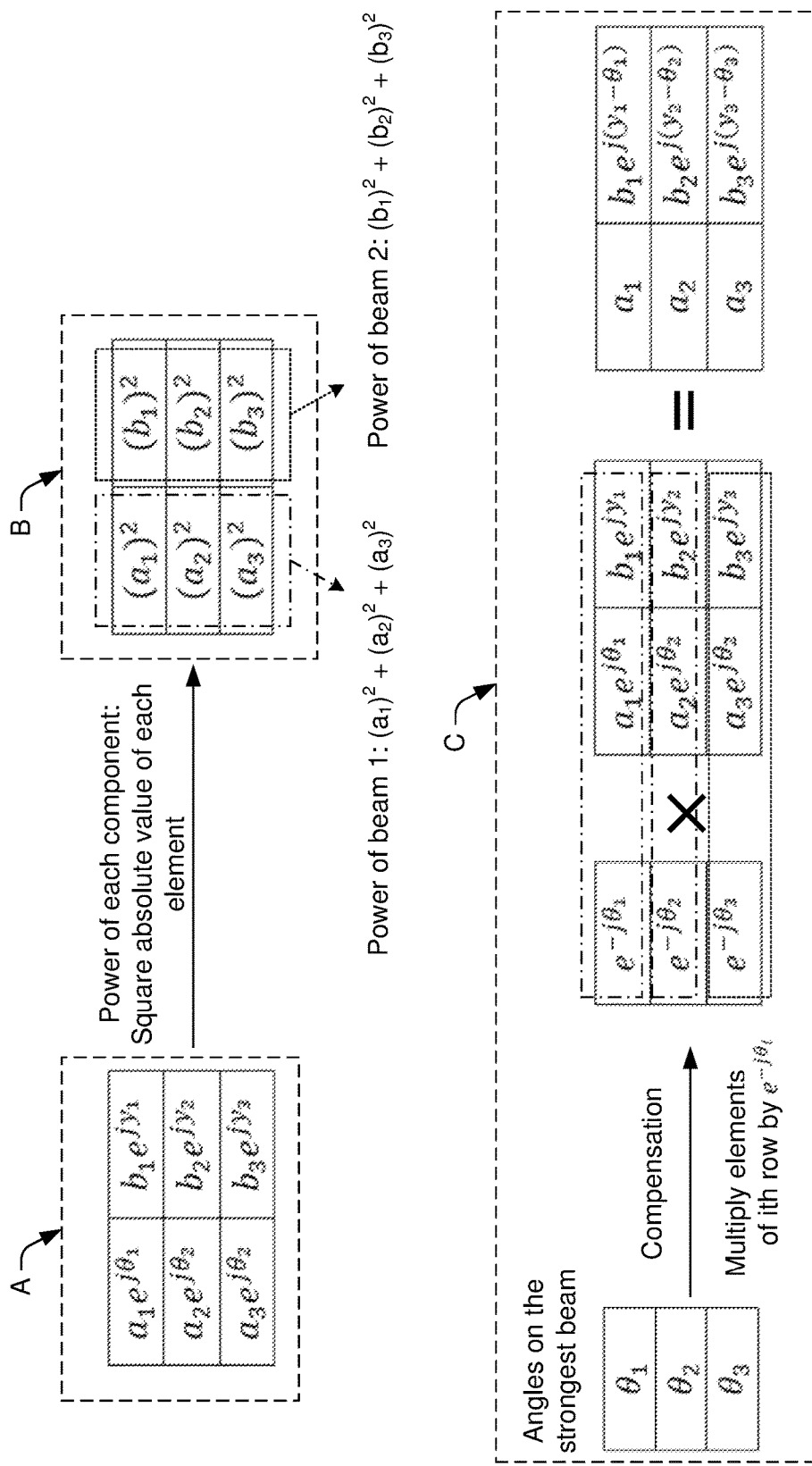
FIG. 3B illustrates the first technique of enhanced sample-invariant pre-processing of CSI in additional detail in accordance with the present disclosure.

FIG. 3B further illustrates some aspects of the above technique in additional detail. For example, given that the translation of the EVs from the antenna-frequency domain to the beam-frequency domain provides a 3×2 matrix of elements for two beams as shown in Part (A), in which there are three elements in the frequency domain and two elements in the beam domain. The power of each of the two beams (e.g., beam 1, beam 2) may be calculated as the square absolute value of each element as shown in Part (B). Furthermore, assuming that beam 1 is the strongest beam, the calculation of the beam angles of the strongest beam and the compensation of the beam angles of the elements in beam 2 based on the beam angles of the strongest beam (beam 1) may be performed as shown in Part (C).

Figure 4:
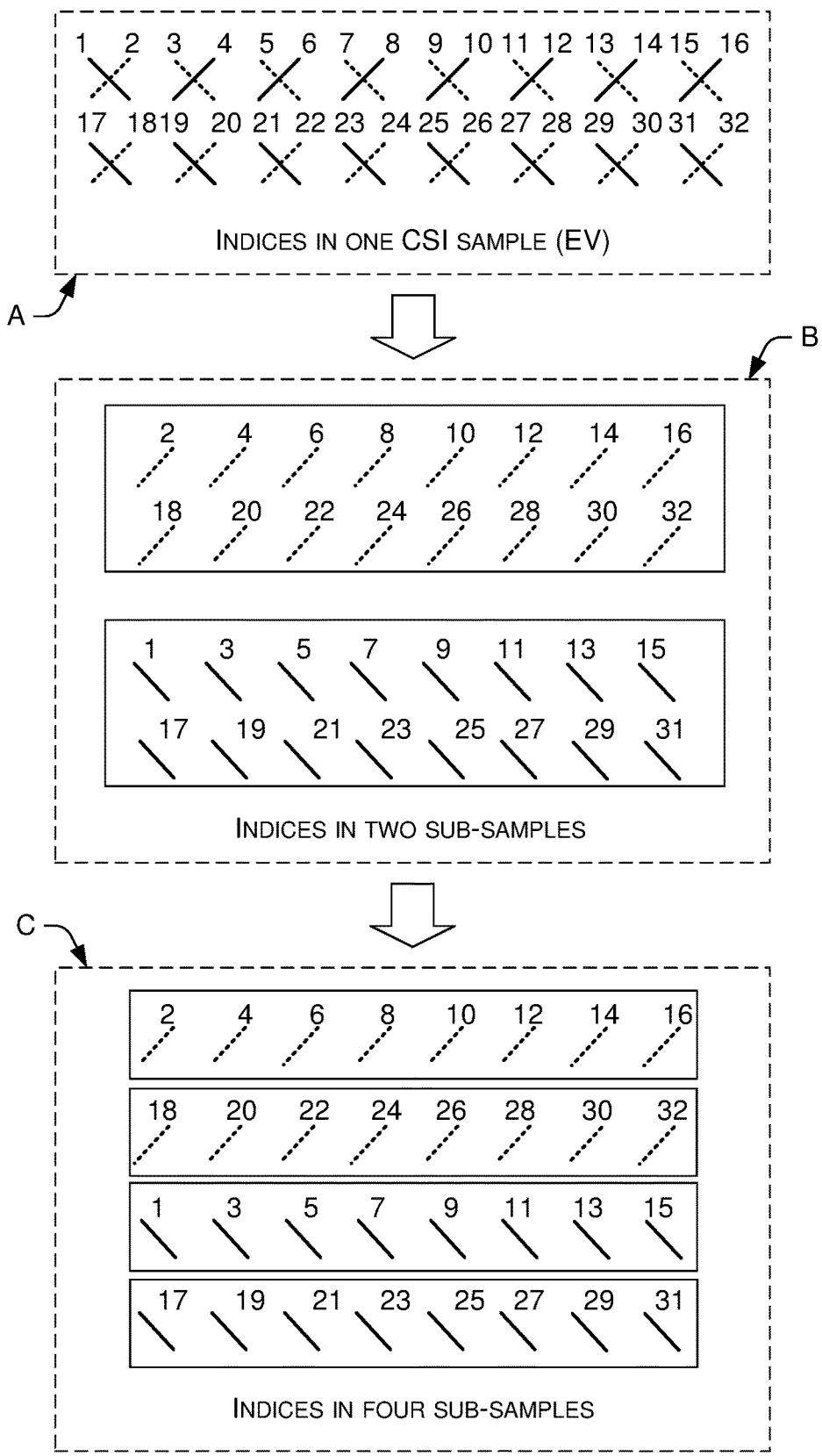
FIG. 4 illustrates a second technique of enhanced sample-invariant pre-processing of CSI in accordance with the present disclosure.

A second technique is a two-step polarization separation that separates the antenna elements over the antenna domain with respect to polarization type. This technique includes performing the following steps: (1) separate the antenna elements by polarization type, i.e., separate antenna indices of a CSI sample (EV) in a matrix according to different polarization types; (2) separate by position, that is, separate antenna indices of each polarization type according to their rows in the matrix to generate sub-samples. FIG. 4 illustrates the above technique in an example 400 that includes 10 subbands (SBs) and four (TX) elements. Part (A) shows a matrix, e.g., antenna indices in one CSI sample (EV), in which columns 1, 3, 5, 7, 9, 11, 13, 15, 17, 19, 21, 23, 25, 27, 29, and 31 are antenna elements of a first polarization, and columns 2, 4, 6, 8, 10, 12, 14, 16, 18, 20, 22, 24, 26, 28, 30, and 32 are antenna elements of a second polarization. Part (B) shows the result of a first step that separates the antenna elements by polarization type, such that the columns corresponding to the first polarization are separated from columns corresponding to the second polarization, resulting in two sub-samples. As a result of the separation, the transitions within each column of a particular polarization may be smoother when compared to transitions in the entire matrix shown in Part (A). Part (C) shows the result of a second step that further separates the antenna elements by position. In one scheme, the position of the columns may denote the positions of the antenna elements on a physical antenna panel. For example, the antenna element of the first polarization denoted by column 16 may be farthest away from the antenna element of the first polarization denoted by column 18. Likewise, the antenna element of the second polarization denoted by column 15 may be farthest away from the antenna element of the second polarization denoted by column 17. Thus, as shown in Part (C), separating rows of antenna elements of the same polarization by row results in four sub-samples. The four sub-samples shown in Part (C) are then fitted into an ML-based encoder for improved compression during the generation of the CSI feedback. However, in some alternative implementations, the two sub-samples shown in Part (B) may also be fitted into an ML-based encoder during the generation of the CSI feedback.

A third technique is a one-step polarization separation with subsequent re-ordering. The initial one-step polarization separation is identical to the first step of the two-step polarization separation as illustrated in Part (B) of FIG. 4. Accordingly, the one-step polarization separation partitions one sample of antenna elements into subsamples by polarization type. In other words, the antenna indices in one CSI sample (EV) may be partitioned such that the columns corresponding to the first polarization are separated from columns corresponding to the second polarization, resulting in the two sub-samples. However, as illustrated in the example shown in Part (A) of FIG. 5, while the indices in one sub-sample may have higher correlation compared to the original sample, the order of indices in the resulting sub-sample may cause a sudden change that has poor correlation when moving from one row of the subsample to the subsequent row of the subsample. Accordingly, position-based re-ordering may be further applied to alleviate this problem. In such position-based re-ordering, the indexing of the antenna elements in a sub-sample may start from a corner element and proceeds sequentially to a next nearest element until all the elements are re-ordered according to the new indexing.

Figure 5:
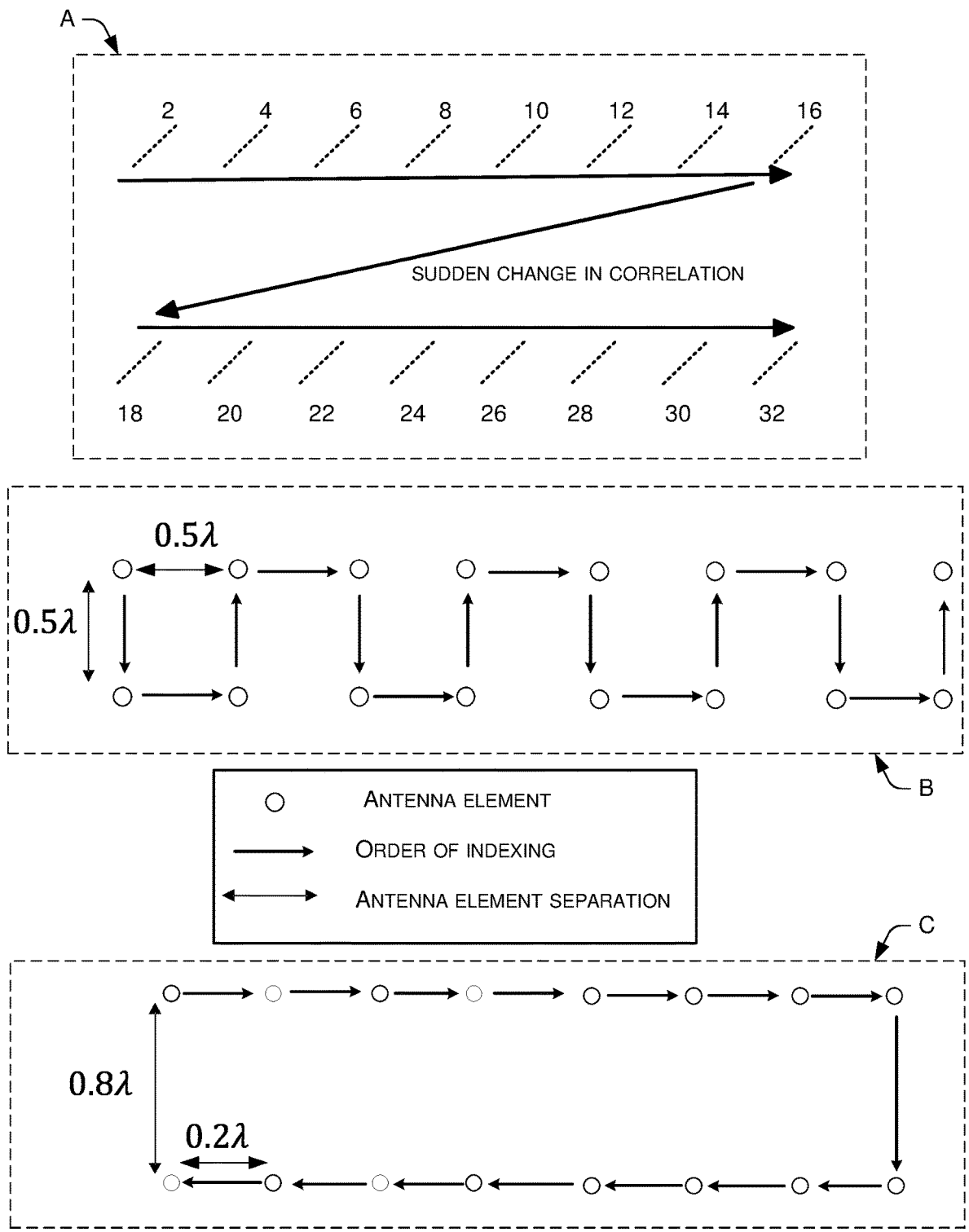
FIG. 5 further illustrates example implementations of a technique of enhanced sample-invariant pre-processing of CSI in accordance with the present disclosure.

FIG. 5 further illustrates example implementations 500 of position-based re-ordering of rows in a subsample. For example, Part (B) of FIG. 5 shows a position-based re-ordering of the antenna element indices for a subsample in which the antenna elements have (0.52λ, 0.5λ) antenna element spacing. Part (C) shows a position-based re-ordering of the antenna element indices for a subsample in which the antenna elements have (0.82λ, 0.2λ) antenna element spacing. In some alternative instances, entropy-based re-ordering may be applied instead of position-based re-ordering. In entropy-based re-ordering, an exhaustive search of the antenna element indices may be performed to identify a re-order of the indices that has the lowest entropy that may result in highest compressibility of the sub-samples.

In some implementations, each of the sub-sample that results from the application of two-step polarization or the application of the one-step polarization with subsequent re-ordering may be further translated from the antenna-frequency domain into a beam-delay domain. Since each resultant sub-sample has smoother changes across both frequency and antenna dimensions compared to the original CSI sample, the translation of a sub-sample into the beam-delay domain may generate a sparse representation that improves compressibility. For example, the application of the two-step polarization separation and PDC to a CSI sample may generate four sub-samples. Subsequently, the translation of the four sub-samples into a delay-beam domain may result in spare representations of the four-sub samples.

Figure 6:
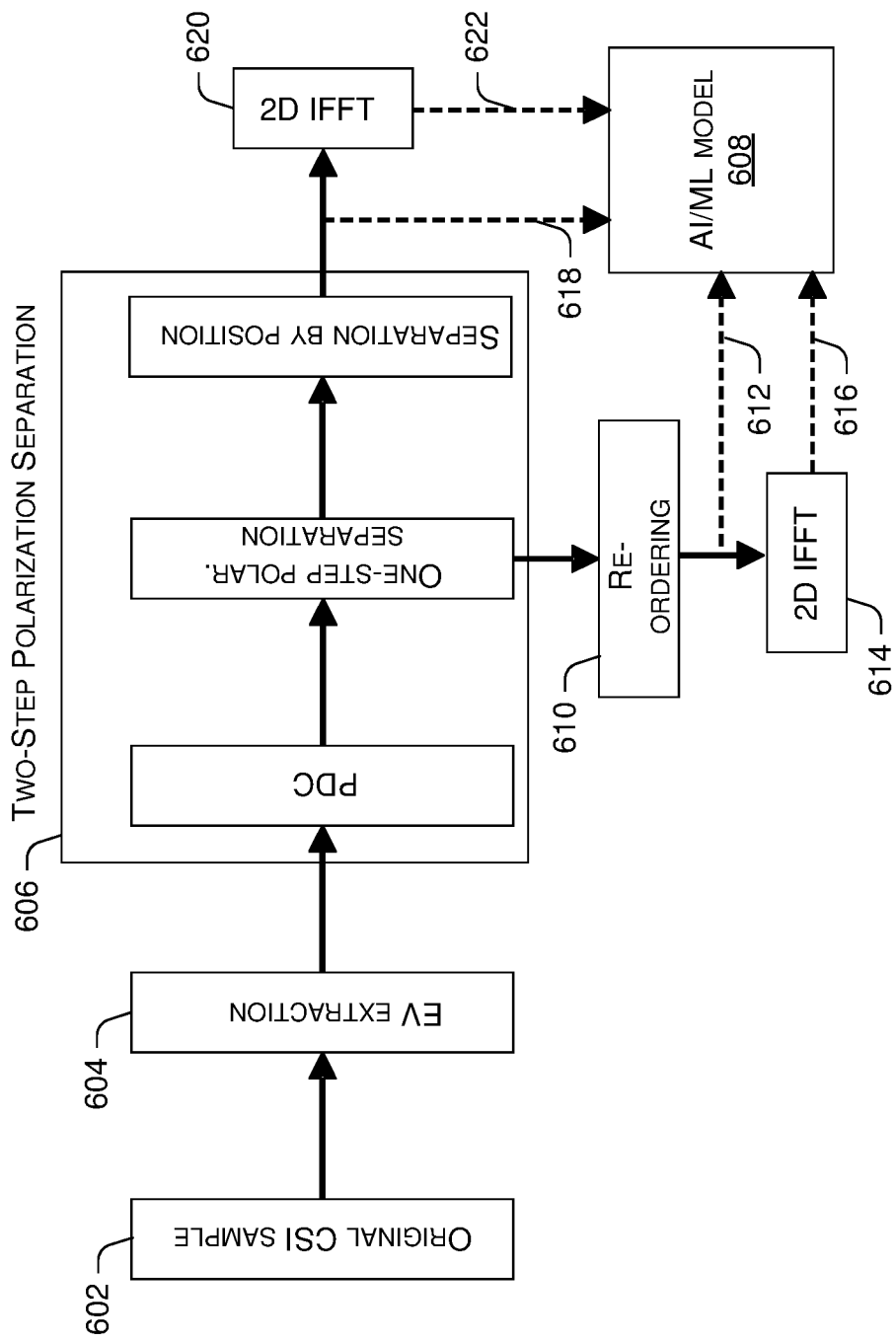
FIG. 6 further illustrates an example implementation of multiple techniques of enhanced sample-invariant pre-processing of CSI in accordance with the present disclosure.

FIG. 6 illustrates an example implementation 600 that includes the use of multiple techniques for enhanced sample-invariant pre-processing of CSI. At 602, an original CSI sample is received by a pre-processing function on a UE. At 604, EVs are extracted from the original CSI sample.

At 606, a two-step polarization separation may be applied to the EVs, in which the two-step polarization may be performed by first applying PDC to the EVs, then a polarization separation that is followed by separation by position to generate the pre-processed CSI for further processing by an ML-based encoder into CSI feedback for transmission to a base station node.

Furthermore, the output at various stages of the two-step polarization separation may be used to train an AI/ML model 608 used by an ML-based encoder of a UE and/or an ML-based decoder of a base station node. For example, at 610, the sub-sample output of the polarization separation may be re-ordered. Following the re-ordering, the re-ordered subsample output, which is in the antenna-frequency domain, may be fed into the AI/ML model 608 for training the model at 612. Alternatively, at 614, the re-ordered subsample output from 610 may be further translated into a beam-delay domain via a 2-dimensional (2D) IFFT. At 616, the translated output data of 614 may be fed into the AI/ML model 608 to train the model.

Additionally, at 618, the sub-sample output of the two-step polarization separation of 606, which is in the antenna-frequency domain, may be fed into the AI/ML model 608 to train the model. Alternatively, at 620, the sub-sample output of the two-step polarization separation of 606 may be further translated into a beam-delay domain via a 2D FFT. At 622, the translated output data of 618 may be fed into the AI/ML model 608 to train the model. Further, while the enhanced sample-invariant pre-processing of the CSI is described above in the context of a pre-processing function of a UE, it will be appreciated that for the purpose of providing training data to an AI/ML model, the enhanced sample-invariant pre-processing of the CSI may be performed by any computing apparatus, such as a server.

Illustrative Implementations

Figure 7:
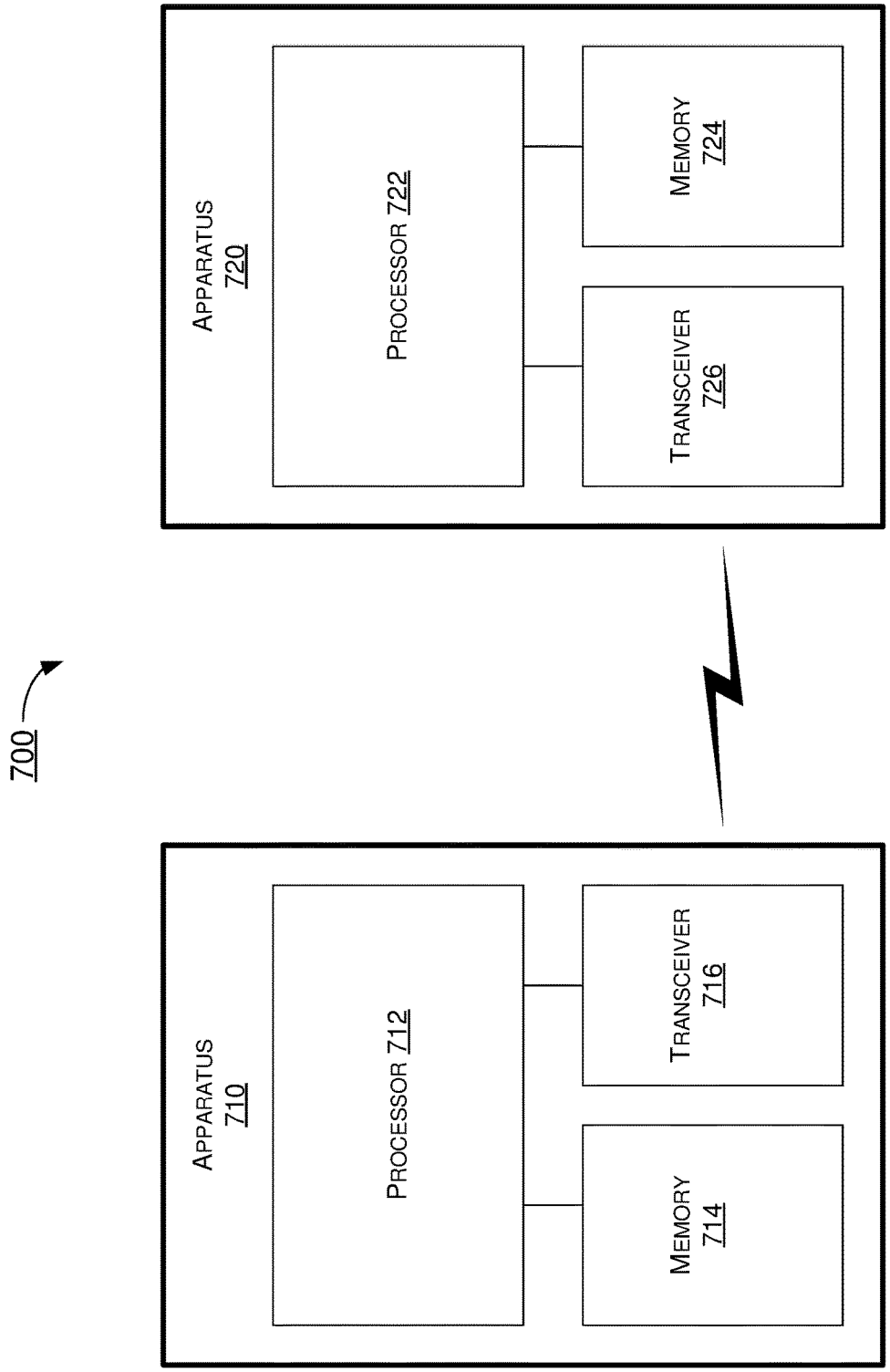
FIG. 7 is a block diagram of an example communication system in accordance with an implementation of the present disclosure.

FIG. 7 illustrates an example communication system 700 having at least an example apparatus 710 and an example apparatus 720 in accordance with an implementation of the present disclosure. Each of apparatus 710 and apparatus 720 may perform various functions to implement schemes, techniques, processes and methods described herein pertaining to CSI pre-processing in wireless communications, including the various schemes described above with respect to various proposed designs, techniques, concepts, schemes, systems and methods described above, including network environment 100, as well as processes described below.

Each of apparatus 710 and apparatus 720 may be a part of an electronic apparatus, which may be a network apparatus or a UE (e.g., UE 110), such as a portable or mobile apparatus, a wearable apparatus, a vehicular device or a vehicle, a wireless communication apparatus or a computing apparatus. For instance, each of apparatus 710 and apparatus 720 may be implemented in a smartphone, a smartwatch, a personal digital assistant, an electronic control unit (ECU) in a vehicle, a digital camera, or a computing equipment such as a tablet computer, a laptop computer or a notebook computer. Each of apparatus 710 and apparatus 720 may also be a part of a machine type apparatus, which may be an IoT apparatus such as an immobile or a stationary apparatus, a home apparatus, a roadside unit (RSU), a wire communication apparatus, or a computing apparatus. For instance, each of apparatus 710 and apparatus 720 may be implemented in a smart thermostat, a smart fridge, a smart door lock, a wireless speaker or a home control center. When implemented in or as a network apparatus, apparatus 710 and/or apparatus 720 may be implemented in an eNodeB in an LTE, LTE-Advanced or LTE-Advanced Pro network or in a gNB or TRP in a 5G network, an NR network or an IoT network.

In some implementations, each of apparatus 710 and apparatus 720 may be implemented in the form of one or more integrated-circuit (IC) chips such as, for example and without limitation, one or more single-core processors, one or more multi-core processors, one or more complex-instruction-set-computing (CISC) processors, or one or more reduced-instruction-set-computing (RISC) processors. In the various schemes described above, each of apparatus 710 and apparatus 720 may be implemented in or as a network apparatus or a UE. Each of apparatus 710 and apparatus 720 may include at least some of those components shown in FIG. 7 such as a processor 712 and a processor 722, respectively, for example. Each of apparatus 710 and apparatus 720 may further include one or more other components not pertinent to the proposed scheme of the present disclosure (e.g., internal power supply, display device and/or user interface device), and, thus, such component(s) of apparatus 710 and apparatus 720 are neither shown in FIG. 7 nor described below in the interest of simplicity and brevity.

In one aspect, each of processor 712 and processor 722 may be implemented in the form of one or more single-core processors, one or more multi-core processors, or one or more CISC or RISC processors. That is, even though a singular term "a processor" is used herein to refer to processor 712 and processor 722, each of processor 712 and processor 722 may include multiple processors in some implementations and a single processor in other implementations in accordance with the present disclosure. In another aspect, each of processor 712 and processor 722 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 712 and processor 722 is a special-purpose machine specifically designed, arranged and configured to perform specific tasks including those pertaining to CSI pre-processing in accordance with various implementations of the present disclosure.

In some implementations, apparatus 710 may also include a transceiver 716 coupled to processor 712. Transceiver 716 may be capable of wirelessly transmitting and receiving data. In some implementations, transceiver 716 may be capable of wirelessly communicating with different types of wireless networks of different radio access technologies (RATs). In some implementations, transceiver 716 may be equipped with a plurality of antenna ports (not shown) such as, for example, four antenna ports. That is, transceiver 716 may be equipped with multiple transmit antennas and multiple receive antennas for multiple-input multiple-output (MIMO) wireless communications. In some implementations, apparatus 720 may also include a transceiver 726 coupled to processor 722. Transceiver 726 may include a transceiver capable of wirelessly transmitting and receiving data. In some implementations, transceiver 726 may be capable of wirelessly communicating with different types of UEs/wireless networks of different RATs. In some implementations, transceiver 726 may be equipped with a plurality of antenna ports (not shown) such as, for example, four antenna ports. That is, transceiver 726 may be equipped with multiple transmit antennas and multiple receive antennas for MIMO wireless communications.

In some implementations, apparatus 710 may further include a memory 714 coupled to processor 712 and capable of being accessed by processor 712 and storing data therein. In some implementations, apparatus 720 may further include a memory 724 coupled to processor 422 and capable of being accessed by processor 722 and storing data therein. Each of memory 714 and memory 724 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 714 and memory 724 may include a type of read-only memory (ROM) such as mask ROM, programmable ROM (PROM), erasable programmable ROM (EPROM) and/or electrically erasable programmable ROM (EEPROM). Alternatively, or additionally, each of memory 714 and memory 724 may include a type of non-volatile random-access memory (NVRAM) such as flash memory, solid-state memory, ferroelectric RAM (Fe-RAM), magnetoresistive RAM (MRAM) and/or phase-change memory.

Each of apparatus 710 and apparatus 720 may be a communication entity capable of communicating with each other using various proposed schemes in accordance with the present disclosure. For illustrative purposes and without limitation, a description of capabilities of apparatus 710, as a UE (e.g., UE 110), and apparatus 720, as a network node (e.g., network node 125) of a network (e.g., network 130 as a 5G/NR mobile network), is provided below in the context of example processes 800-1000.

Illustrative Processes

Each of the processes 800 and 900 may represent an aspect of implementing various proposed designs, concepts, schemes, systems and methods described above, whether partially or entirely, including those pertaining to those described above. Each process may include one or more operations, actions, or functions as illustrated by one or more of blocks. Although illustrated as discrete blocks, various blocks of each process may be divided into additional blocks, combined into fewer blocks, or eliminated, depending on the desired implementation. Moreover, the blocks/sub-blocks of each process may be executed in the order shown in each figure, or, alternatively in a different order. Furthermore, one or more of the blocks/sub-blocks of each process may be executed iteratively. Each process may be implemented by or in apparatus 710 and/or apparatus 720 as well as any variations thereof. Solely for illustrative purposes and without limiting the scope, each process is described below in the context of apparatus 710 as a UE (e.g., UE 110) and apparatus 720 as a communication entity such as a network node or base station (e.g., terrestrial network node 125 or non-terrestrial network node 128) of a network (e.g., network 130 as a 5G/NR mobile network).

Figure 8:
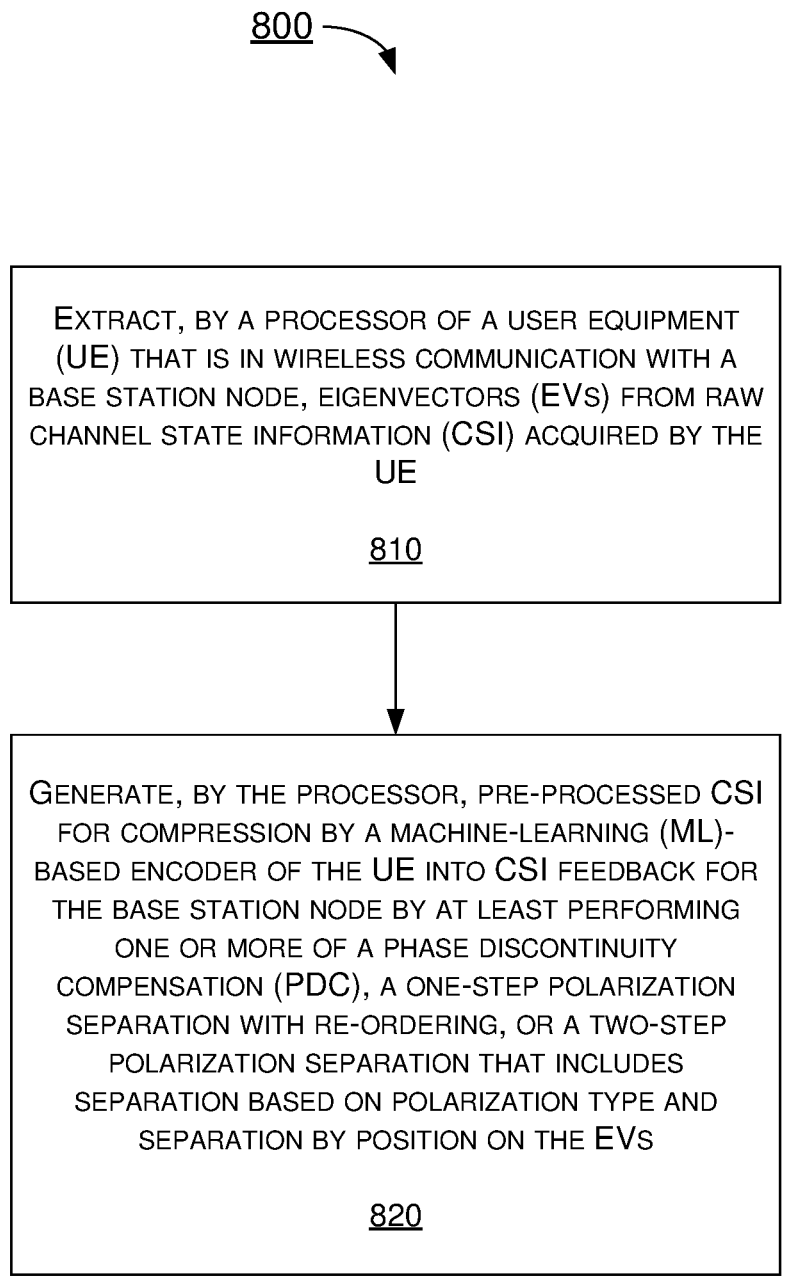
FIG. 8 is a flowchart of a first example process in accordance with an implementation of the present disclosure.

FIG. 8 illustrates an example process 800 in accordance with an implementation of the present disclosure. Process 800 may begin at block 810. At 810, process 800 may include processor 712 of apparatus 710 extracting EVs from CSI acquired by apparatus 710. Process 800 may proceed from 810 to 820.

At 820, process 800 may include processor 712 generating pre-processed CSI for compression by a machine-learning (ML)-based encoder of the apparatus 710 into CSI feedback for apparatus 720 by at least performing one or more of a PDC, a one-step polarization separation with re-ordering, or a two-step polarization separation that includes separation based on polarization type and separation by position on the EVs.

In some implementations, in performing the PDC, process 800 may include processor 712 performing certain operations. For instance, process 800 may include processor 712 translating the EVs from an antenna-frequency domain to a beam-frequency domain. Additionally, process 800 may include processor 712 identifying a strongest beam in the beam-frequency domain and calculating beam angles for the elements in the strongest beam. Moreover, process 800 may include processor 712 compensating a beam angle of each element belonging to the one or more other beams in the beam-frequency domain by a calculated beam angle of a corresponding element of the strongest beam to generate compensated EVs, and translating the compensated EVs back to the antenna-frequency domain.

In some implementations, in performing the two-step polarization separation, process 800 may include processor 712 performing certain operations. For instance, process 800 may include processor 712 separating antenna indices in a CSI sample of an EV according to different polarization types, and separating corresponding antenna indices of each polarization type according to their rows in a matrix to generate multiple sub-samples. Additionally, in some instances, each of the multiple sub-samples in the antenna-frequency domain may be translated into a beam-delay domain to generate a corresponding sparse representation.

In some implementations, in performing the one-step polarization separation with re-ordering, process 800 may include processor 712 performing certain operations. For instance, process 800 may include processor 712 separating antenna indices in a CSI sample of an EV into multiple sub-samples according to polarization types of the antenna indices, and applying position-based re-ordering or entropy-based re-ordering to each of the multiple sub-samples to re-order corresponding antenna indices in each sub-sample.

Additionally, process 800 may further include processor 712 compressing the CSI samples by the ML-based encoder to generate CSI feedback, and sending the CSI feedback to a base station node for decompression by an ML-based decoder of the base station node into reconstructed CSI. In some implementations, the ML-based encoder includes a trained CNN-based model or a trained transformer-based model.

FIG. 9 illustrates an example process 900 in accordance with an implementation of the present disclosure. Process 900 may begin at block 910. At 910, process 900 may include apparatus 720 receiving CSI feedback from apparatus 710. The CSI feedback is generated from EVs that are extracted from raw CSI acquired by apparatus 710, pre-processed using one or more of a PDC, a one-step polarization separation with re-ordering, or a two-step polarization separation that includes separation based on polarization type and separation by position, and compressed by an ML-based encoder of apparatus 710. Process 900 may proceed from 910 to 920.

At 920, process 900 may include processor 722 generating reconstructed CSI by at least decompressing the CSI feedback via an ML-based decoder of the base station node. Additionally, process 900 may further include processor 722 performing one or more tasks based on the reconstructed CSI. For example, the one or more tasks may include scheduling beamforming for one or more antennas of the base station node.

Figure 10:
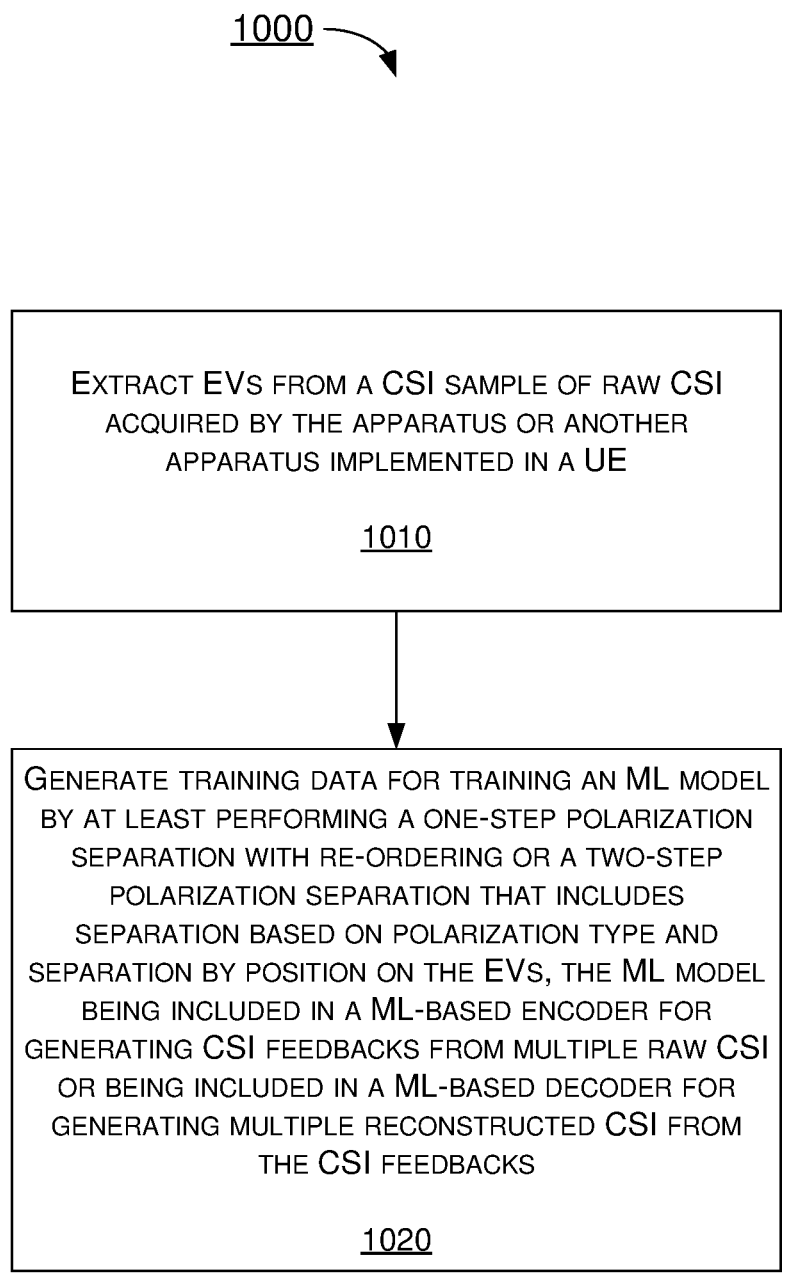
FIG. 10 is a flowchart of a third example process in accordance with an implementation of the present disclosure.

FIG. 10 illustrates an example process 1000 in accordance with an implementation of the present disclosure. Process 1000 may represent an aspect of implementing various proposed designs, concepts, schemes, systems and methods described above, whether partially or entirely, including those pertaining to those described above. More specifically, process 1000 may represent an aspect of the proposed concepts and schemes pertaining to generating training data for an ML model that is used to process CSI. Process 1000 may include one or more operations, actions, or functions as illustrated by one or more of blocks 1010 and 1020. Although illustrated as discrete blocks, various blocks of process 1000 may be divided into additional blocks, combined into fewer blocks, or eliminated, depending on the desired implementation. Moreover, the blocks/sub-blocks of process 600 may be executed in the order shown in FIG. 10 or, alternatively, in a different order. Furthermore, one or more of the blocks/sub-blocks of process 1000 may be executed iteratively. Process 1000 may be implemented by or in apparatus 710, apparatus 720 any variations thereof, or another similar apparatus. Solely for illustrative purposes and without limiting the scope, process 1000 is described below in the context of apparatus 710 as a UE (e.g., UE 110) and apparatus 720 as a communication entity such as a network node or base station (e.g., terrestrial network node 125 or non-terrestrial network node 128) of a network (e.g., network 130 as a 5G/NR mobile network). Process 1000 may begin at block 1010.

At 1010, process 1000 may include a processor of an apparatus extracting EVs from a CSI sample of raw CSI acquired by the apparatus or another apparatus. Process 1000 may proceed from 1010 to 1020.

At 1020, process 1000 may include the processor generating training data for training an ML model by at least performing a one-step polarization separation with re-ordering or a two-step polarization separation that includes separation based on polarization type and separation by position on the EVs. The ML model may be included in an ML-based encoder for generating CSI feedback from multiple raw CSI or included in an ML-based decoder for generating multiple reconstructed CSI from the CSI feedback.

In some implementations, in performing the one-step polarization separation with re-ordering, process 1000 may include the processor performing certain operations. For instance, process 1000 may include separating antenna indices in a CSI sample of an EV into multiple sub-samples according to polarization types of the antenna indices, and applying position-based re-ordering or entropy-based re-ordering to each of the multiple sub-samples to re-order corresponding antenna indices in each sub-sample to generate a re-ordered subsample output that is in the antenna-frequency domain, such that generating the training data include providing the re-ordered subsample output that is in the antenna-frequency domain as the training data. Additionally, the processor may further translate the re-ordered subsample output that is in the antenna-frequency domain into a beam-delay domain to generate a translated output in the beam-delay domain, and provide the translated output in the beam-delay domain as the training data.

In some implementations, in performing the two-step polarization separation, process 1000 may include the processor performing certain operations. For instance, process 1000 may include the processor separating antenna indices in a CSI sample of an EV according to different polarization types, and separating corresponding antenna indices of each polarization type according to their rows in a matrix to generate multiple sub-samples that are in the antenna-frequency domain, such that generating the training data include providing the multiple sub-samples that are in the antenna-frequency domain as the training data. Additionally, the processor may further translate the multiple sub-samples that are in the antenna-frequency domain into a beam-delay domain to generate a translated output in the beam-delay domain, and provide the translated output in the beam-delay domain as the training data.

In some implementations, generating the training data may further include prior to performing the one-step polarization separation with reordering or the two-step polarization separation, the processor may perform a PDC on the EVs.

In some implementations, in performing the PDC on the EVs, process 1000 may include the processor performing certain operations. For example, process 1000 may include the processor translating the EVs from an antenna-frequency domain to a beam-frequency domain. Additionally, process 1000 may include the processor identifying a strongest beam in the beam-frequency domain and calculating beam angles for the elements in the strongest beam. Moreover, process 1000 may include the processor compensating a beam angle of each element belonging to the one or more other beams in the beam-frequency domain by a calculated beam angle of a corresponding element of the strongest beam to generate compensated EVs, and translating the compensated EVs back to the antenna-frequency domain.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for the sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   extracting, by a processor of a user equipment (UE) that is in wireless communication with a base station node, eigenvectors (EVs) from raw channel state information (CSI) acquired by the UE; and
   generating, by the processor, pre-processed CSI for compression by a machine-learning (ML)-based encoder of the UE into CSI feedback for the base station node by at least performing one or more of a phase discontinuity compensation (PDC), a one-step polarization separation with re-ordering, or a two-step polarization separation that includes separation based on polarization type and separation by position on the EVs.

2. The method of claim 1, wherein the performing the PDC includes:
   translating the EVs from an antenna-frequency domain to a beam-frequency domain;
   Identifying a strongest beam in the beam-frequency domain and calculate beam angles for elements in the strongest beam;
   compensating a beam angle of each element belonging to the one or more other beams in the beam-frequency domain by a calculated beam angle of a corresponding element of the strongest beam to generate compensated EVs; and
   translating the compensated EVs back to the antenna-frequency domain.

3. The method of claim 1, wherein performing the two-step polarization separation includes:
   separating antenna indices in a CSI sample of an EV according to different polarization types; and
   separating corresponding antenna indices of each polarization type according to their rows in a matrix to generate multiple sub-samples.

4. The method of claim 3, wherein the multiple sub-samples are in an antenna-frequency domain, and wherein the generating the pre-processed CSI further comprises translating each of the multiple sub-samples from the antenna-frequency domain into a beam-delay domain to generate a corresponding sparse representation.

5. The method of claim 1, wherein the performing the one-step polarization separation with re-ordering includes:
   separating antenna indices in a CSI sample of an EV into multiple sub-samples according to polarization types of the antenna indices; and
   applying position-based re-ordering or entropy-based re-ordering to each of the multiple sub-samples to re-order corresponding antenna indices in each sub-sample.

6. The method of claim 5, wherein the multiple sub-samples are in an antenna-frequency domain, and wherein the generating the pre-processed CSI further comprises translating each of the multiple sub-samples from the antenna-frequency domain into a beam-delay domain to generate a corresponding sparse representation.

7. The method of claim 1, further comprising:
   compressing the pre-processed CSI by the ML-based encoder to generate CSI feedback; and
   sending the CSI feedback to a base station node for decompression by an ML-based decoder of the base station node into reconstructed CSI.

8. The method of claim 1, wherein the ML-based encoder includes a trained convolutional neural network (CNN)-based model or a trained transformer-based model.

9. A method, comprising:
   receiving, at a base station node, channel state setting (CSI) feedback from a user equipment (UE), the CSI feedback being generated from eigenvectors (EVs) that are extracted from raw CSI acquired by the UE, pre-processed using one or more of a phase discontinuity compensation (PDC), a one-step polarization separation with re-ordering, or a two-step polarization separation that includes separation based on polarization type and separation by position, and compressed by a machine-learning (ML)-based encoder of the UE; and
   generating, by a processor of the base station node, reconstructed CSI by at least decompressing the CSI feedback via an ML-based decoder of the base station node.

10. The method of claim 9, further comprising performing, by the processor of the base station node, one or more tasks based on reconstructed CSI.

11. The method of claim 10, wherein the one or more tasks include scheduling beamforming for one or more antennas of the base station node.

12. The method of claim 9, wherein the base station node is a gNodeB of a wireless carrier network.

13. The method of claim 9, wherein the ML-based encoder includes a trained convolutional neural network (CNN)-based model or a trained transformer-based model.

14. An apparatus, comprising:
a transceiver configured to communicate wirelessly; and
a processor coupled to the transceiver and configured to perform operations comprising:
extracting eigenvectors (EVs) from a channel state information (CSI) sample of raw CSI acquired by the apparatus or another apparatus implemented in a user equipment (UE); and
generating training data for training an ML model by at least performing a one-step polarization separation with re-ordering or a two-step polarization separation that includes separation based on polarization type and separation by position on the EVs,
the ML model being included in an ML-based encoder for generating CSI feedback from multiple raw CSI or being included in an ML-based decoder for generating multiple reconstructed CSI from the CSI feedback.

15. The apparatus of claim 14, wherein the performing the one-step polarization separation with re-ordering includes:
separating antenna indices in a CSI sample of an EV into multiple sub-samples according to polarization types of the antenna indices; and
applying position-based re-ordering or entropy-based re-ordering to each of the multiple sub-samples to reorder corresponding antenna indices in each sub-sample to generate a re-ordered subsample output that is in an antenna-frequency domain,
and wherein the generating the training data include providing the re-ordered subsample output that is in the antenna-frequency domain as the training data.

16. The apparatus of claim 15, wherein the generating the training data further includes:
translating the re-ordered subsample output that is in the antenna-frequency domain into a beam-delay domain to generate a translated output in the beam-delay domain; and
providing the translated output in the beam-delay domain as the training data.

17. The apparatus of claim 14, wherein the performing the two-step polarization separation includes:
separating antenna indices in a CSI sample of an EV according to different polarization types; and
separating corresponding antenna indices of each polarization type according to their rows in a matrix to generate multiple sub-samples that are in an antenna-frequency domain,
and wherein the generating the training data include providing the multiple sub-samples that are in the antenna-frequency domain as the training data.

18. The apparatus of claim 17, wherein the generating the training data further includes:
translating the multiple sub-samples that are in the antenna-frequency domain into a beam-delay domain to generate a translated output in the beam-delay domain; and
providing the translated output in the beam-delay domain as the training data.

19. The apparatus of claim 17, wherein the generating the training data further includes prior to performing the one-step polarization separation with reordering or the two-step polarization separation, performing a phase discontinuity compensation (PDC) on the EVs.

20. The apparatus of claim 19, wherein the performing the PDC on the EVs includes:
translating the EVs from an antenna-frequency domain to a beam-frequency domain;
identifying a strongest beam in the beam-frequency domain and calculate beam angles for elements in the strongest beam;
compensating a beam angle of each element belonging to the one or more other beams in the beam-frequency domain by a calculated beam angle of a corresponding element of the strongest beam to generate compensated EVs; and
translating the compensated EVs back to the antenna-frequency domain.

* * * * *